US012735928B2

(12) United States Patent
Bertani

(10) Patent No.: US 12,735,928 B2
(45) Date of Patent: Sep. 15, 2026

(54) HINGE WITH ADJUSTABLE FRICTION

(71) Applicant: ELESA S.p.A., Milan (IT)

(72) Inventor: Alberto Bertani, Milan (IT)

(73) Assignee: ELESA S.P.A., Milan (IT)

( * ) Notice: Subject to any disclaimer, the term of this patent is extended or adjusted under 35 U.S.C. 154(b) by 0 days.

(21) Appl. No.: 18/585,267

(22) Filed: Feb. 23, 2024

(65) Prior Publication Data

US 2024/0287840 A1 Aug. 29, 2024

(30) Foreign Application Priority Data

Feb. 27, 2023 (IT) ............................ IT20230003513

(51) Int. Cl.
*E05D 5/14* (2006.01)
*E05D 3/02* (2006.01)

(52) U.S. Cl.
CPC ................. *E05D 5/14* (2013.01); *E05D 3/02* (2013.01); *E05D 2700/02* (2013.01)

(58) Field of Classification Search
CPC ......... E05D 5/14; E05D 3/02; E05D 2700/02; E05D 11/081; E05D 11/082; E05Y 2999/00; E05Y 2201/25
See application file for complete search history.

(56) References Cited

U.S. PATENT DOCUMENTS 365,413 A * 6/1887 Stuart ....................... B62C 5/00 16/342
1,004,237 A * 9/1911 Brandes ..................... B60J 1/04 16/340
1,847,937 A * 3/1932 Fetters ....................... E05D 3/02 16/339
1,956,040 A * 4/1934 Meyer ................... E05D 11/081 16/340
5,333,356 A * 8/1994 Katagiri ................ G06F 1/1681 16/342
5,388,308 A * 2/1995 Meeuwissen .......... F16M 11/06 285/184

(Continued)

FOREIGN PATENT DOCUMENTS

AU 2013337586 A1 * 4/2015 ........... E05D 7/0045
BO 20080670 A1 * 5/2010

(Continued)

OTHER PUBLICATIONS

Search Report for Italian Application No. 102023000003513 dated Sep. 6, 2023.

*Primary Examiner* — Jason W San
*Assistant Examiner* — Matthew J Sullivan
(74) *Attorney, Agent, or Firm* — Chrisman Gallo Tochtrop LLC

(57) ABSTRACT

Hinge for moving a door with respect to a stationary wall characterized in that it is composed of two opposing wings provided with through fixing holes and provided with a mutual engagement area, the mutual engagement area including shaped and complementary bushings protruding from one of the walls of each of the wings, the bushings housing, respectively a matching and friction system composed of a wedge-shaped matching element and a bushing-shaped matching element opposed to each other, kept in mutual connection by a screw-nut system.

8 Claims, 3 Drawing Sheets

(56) References Cited

U.S. PATENT DOCUMENTS

| | | | | | |
|---|---|---|---|---|---|
| 5,715,576 | A * | 2/1998 | Liu | G06F 1/1681 16/329 |
| 5,915,440 | A * | 6/1999 | Repo | H04M 1/0216 16/303 |
| 6,101,676 | A * | 8/2000 | Wahl | G06F 1/1679 403/114 |
| 6,381,808 | B1 * | 5/2002 | Kida | G06F 1/1681 16/342 |
| 8,024,841 | B2 * | 9/2011 | Shen | G06F 1/1681 16/342 |
| 8,468,654 | B2 * | 6/2013 | Zhang | G06F 1/1681 16/386 |
| 9,085,254 | B2 * | 7/2015 | Navarro | B60N 2/885 |
| 9,388,617 | B2 * | 7/2016 | Onda | E05D 11/082 |
| 10,822,851 | B2 * | 11/2020 | Graham | A47J 37/0786 |
| 11,269,286 | B2 * | 3/2022 | An | G03G 21/1647 |
| 12,209,450 | B2 * | 1/2025 | Ishigaya | E05D 11/082 |
| 2002/0112319 | A1 * | 8/2002 | Kida | G06F 1/1616 16/342 |
| 2006/0225248 | A1 * | 10/2006 | Ishiwata | E05D 11/082 16/330 |
| 2009/0165248 | A1 * | 7/2009 | Wang | E05D 11/082 16/339 |
| 2010/0077565 | A1 * | 4/2010 | Huang | E05D 11/082 16/342 |

FOREIGN PATENT DOCUMENTS

| | | | | | |
|---|---|---|---|---|---|
| CN | 111395898 | A | | 7/2020 | |
| CN | 119122376 | A | * | 12/2024 | |
| DE | 2534024 | A | * | 2/1976 | |
| DE | 2534024 | A1 | | 2/1976 | |
| DE | 29814134 | U1 | * | 12/1999 | E05D 11/082 |
| DE | 102011116857 | B3 | * | 4/2013 | H01R 13/6275 |
| FR | 2513687 | A1 | * | 4/1983 | |
| GB | 1304902 | A | * | 1/1973 | |
| GB | 1404765 | A | * | 9/1975 | E05D 11/082 |
| GB | 1483214 | A | * | 8/1977 | E05D 11/081 |
| GB | 2201999 | A | * | 9/1988 | E05D 11/081 |
| IT | BO20080670 | A1 | * | 5/2010 | |
| JP | 2016211662 | A | * | 12/2016 | |
| JP | 6501301 | B2 | * | 4/2019 | |
| KR | 20010007395 | A | * | 1/2001 | |
| WO | WO-2015010686 | A1 | * | 1/2015 | E05D 11/081 |

* cited by examiner

HINGE WITH ADJUSTABLE FRICTION

FIELD OF THE INVENTION

The present invention relates to a hinge for moving panels or doors, particularly to an adjustable friction hinge.

BACKGROUND OF THE INVENTION

In the large selection of hinges, that is devices for moving panels or doors with respect to a machinery or masonry wall, a category that is arousing growing interest, to satisfy the needs of occupational safety, are the so-called adjustable friction hinges, that is, hinges conventionally including of two wings and provided with a central pivot, an intermediate body aimed at adjusting the friction, such as, for example, a screw being associated to the pivot.

Since the screw essentially works on the pivot, in case a reduced friction force on the hinge movement is desired, the screw must be loosened and subsequently, the elements that form the engagement (typically the interference between pivot and internal surface of the eyelets provided on the hinge wings) disengaged.

Similarly, by increasing friction (through the screw) it is possible to jam the operating mechanism of the hinge by seizing the other hinge components.

At present, it appears impossible to perform a precise and readily reversible adjustment, which instead proves to be an always growing need of the market, that needs to be able to work with extreme precision and ease, and at the same time with as little waste of time as possible.

In particular, the need is felt to make the adjustment operations of an adjustable friction hinge easier, in order to increase and decrease the resistance expressed by the hinge at the time of opening or closing one door or panel on which said hinge was installed.

Object of the present invention is hence to obtain a hinge provided with friction media that can be adjusted in a short time, without any jamming risks and with maximum precision.

Said object is obtained by a hinge for moving a door with respect to a stationary wall characterized in that it includes two wings provided with a mutual engagement area, said mutual engagement area including shaped and complementary bushings, protruding from one of the walls of each of said wings, said bushings housing therein, opposed to each other, respectively a wedge-shaped matching element and a bushing-shaped matching element kept in a screw-nut mutual engagement, said screw having its head housed inside said wedge-shaped element and said nut being housed inside said bushing-shaped element.

SHORT DESCRIPTION OF THE DRAWINGS

Anyway, additional features and advantages of the invention will become more evident from the following detailed description of a preferred embodiment, provided merely for illustrative and non limiting purposes and depicted in the attached drawings, wherein.

Figure 1:
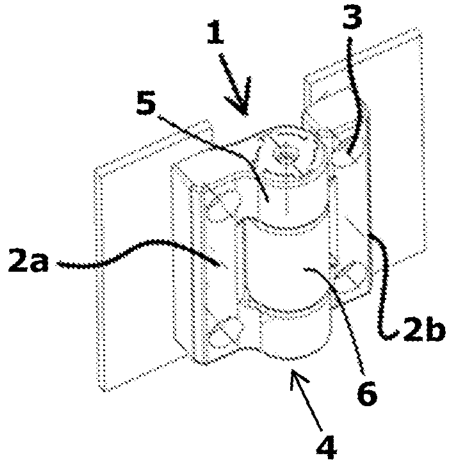
FIG. 1 represents one embodiment of the present invention.
Figure 2:
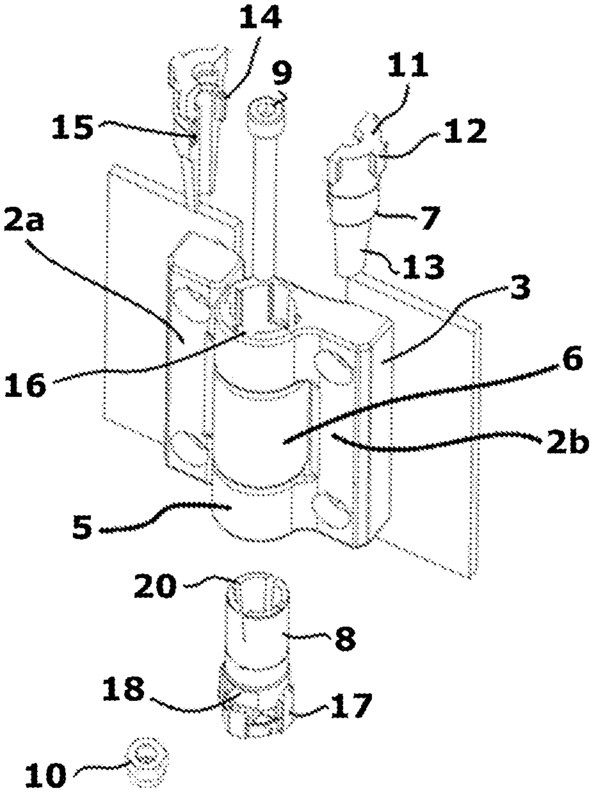
FIG. 2 is an exploded view of the embodiment of FIG. 1.
Figure 5A:
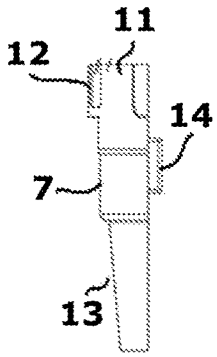
Figure 5B:
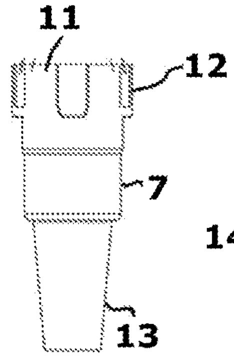
Figure 5C:
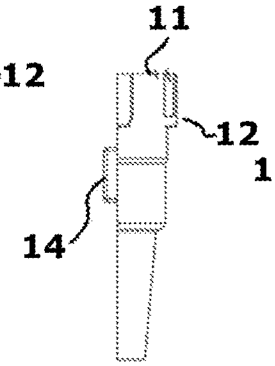
Figure 5D:
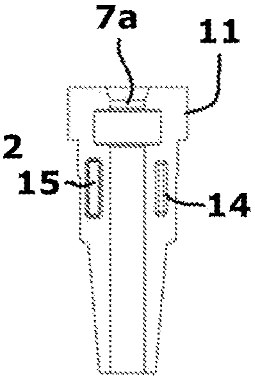
Figure 5E:
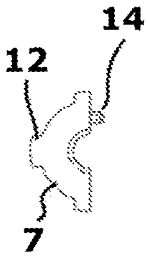
Figure 6A:
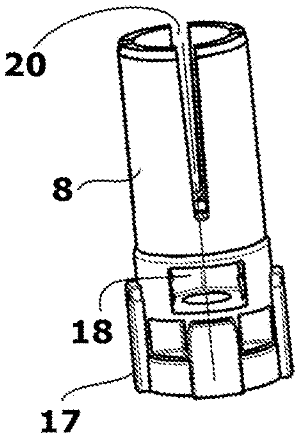
Figure 6B:
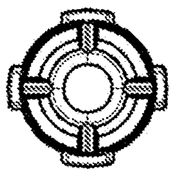
Figure 6C:
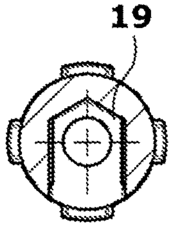
Figure 6D:
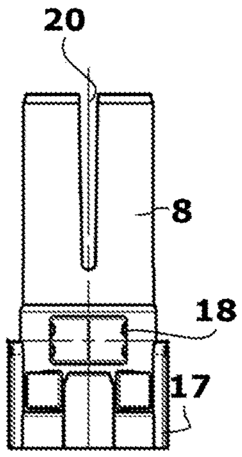
Figure 6E:
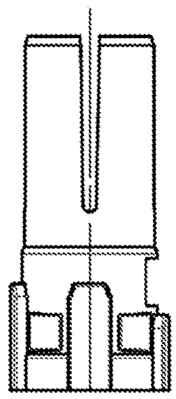

FIGS. 5*a* to 5*e* are side, front, internal and top views of a matching element of the embodiment of FIG. 1;

FIGS. 6*a* to 6*e* are perspective, sectional, top, right side, and left side views of a matching bushing of the embodiment of FIG. 1.

DETAILED DESCRIPTION OF THE PREFERRED EMBODIMENT

In the figures, an adjustable resistance hinge 1 according to the present invention is depicted. The hinge is composed of two opposing wings 2*a*, 2*b* provided with through fixing holes 3 and provided with a mutual engagement area 4, said mutual engagement area 4 including shaped and complementary bushings 5, 6 protruding from one of the walls of each of said wings. In particular, in the depicted embodiment, two side bushings 5 spaced apart by a void, are provided extending from the ends of one of said wings, and one bushing 6 centrally extending from the other of said wings.

To ensure a stable hold in position of the two wings composing the hinge and a mutual engagement, a matching and friction system is provided composed of the combination of a complementary and opposed wedge-shaped matching element 7 and a bushing-shaped matching element 8, kept in mutual connection by a screw 9-nut 10 system.

The wedge-shaped matching element 7 is composed (as it can be verified with even higher precision from FIGS. 5*a*-5*d*) by two complementary and symmetric half-elements brought into mutual engagement: hereinafter a description is made of one of said two half-elements, the other being specular to it. Each half-wedge forming the wedge 7 is composed of an essentially cylindrical head 11 provided with four equally spaced protruding ribs 12, from the bottom surface of said cylindrical head 11, a frustoconical cone appendix 13 extending downwards. Centrally, the wedge-shaped matching element 7 is pierced and houses said screw 9 in a suitable site 7*a*. A top hole is provided for the engagement of a specific tool with the head of the said screw 9. Said wedge-shaped matching element 7 includes two halves that are brought into mutual engagement by the sealing connection of tabs 14, protruding from the side wall of one of said halves, with slots 15, provided on the side wall of the other of said halves.

For a correct fitting of the wedge-shaped matching element 7 into the bushings 5, along the inner wall of said bushings 5 four equally spaced grooves 16 suitable for housing said ribs 12 are provided.

Opposed to the wedge-shaped matching element 7, as depicted in FIGS. 6*a*-6*e*, there is a bushing-shaped matching element 8, including of a cylindrical elongated element, also provided with ribs 17 along the side wall in correspondence to the bottom surface, said ribs 17 being suitable for engaging with complementary grooves arranged inside the bushing 5. The bushing 8 houses a nut 10 therein.

In particular, the nut 10 is inserted through the opening slot 18 and held in a stable position in a recess 19 shaped to keep said nut in a fixed and stable position. On the top surface, the cylindrical body provides a set of four longitudinal slots 20, suitable for offering a higher degree of flexibility for the insertion of the bushing itself.

Figure 4:
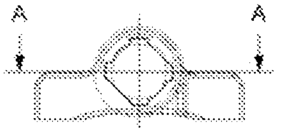
FIG. 4 is a top view of the embodiment of FIG. 1.
Figure 3:
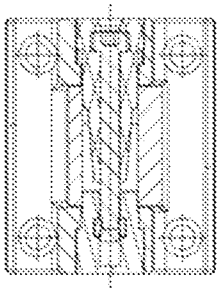
FIG. 3 is a cross-sectional view of the embodiment of FIG. 1.

From the section of FIG. 4, the particular shape of the structure ready for use can be recognised. In particular, the arrangement of the individual elements composing the present invention is defined, that is bushings 5 and 6, respectively housing the wedge-shaped insert 7, bushing-shaped insert 8, and screw-nut system that connects the two inserts.

In particular, the peculiar contour of the wedge-shaped insert 7 finds a first matching point in the contact between rib and slot, as it is well observed, subsequently, the cylindrical head 11 finds its housing inside bushing 6, the truncated cone appendix extending to over half the length, allowing air to circulate inside bushing 6.

In turn, the bushing-shaped insert 8 finds a first matching point in the contact between rib 16 and slot 12, then fitting itself inside bushing 6. Screw 9 is in stationary engagement with nut 10.

Wedge-shaped 7 and bushing-shaped 8 insert elements are inserted inside the main hinge body so that the presence of the matching and friction system cannot be essentially recognised, the two externally visible elements having the substantial appearance of closing caps for the mutual engagement channel between the two wings.

In the assembling phase, a worker must fit the screw 9 inside the two elements composing the wedge-shaped insert 7 and the nut 10 inside the bushing-shaped insert 8 and fit them between the bushing-shaped elements 5 of the wing 3, and subsequently, brings them in mutual engagement via common screwing.

In operation, the adjustment of the rotation speed of the movable door with respect to the stationary structure, or equally the blocking force exerted on the movement, occurs by screwing the screw, which determines the wedge 7 to become closer to the bushing 8, up to their contact and subsequent fitting of the wedge inside the bushing, with the consequent broadening of the top surface of the bushing-shaped insert 8, thanks to the provision of four slots that make the bushing-shaped insert a more pliable.

The broadening—at least in part—of the bushing-shaped insert causes the creation of a friction surface against the wall of the wing of the rotating hinge and determines a decrease in the manoeuvrability of the opening. Similarly, a lightening of the draw involves an increase in the manoeuvrability of the movable wing and a higher speed in the opening and closing operations of the panel.

As it can be understood, the thus obtained device allows to precisely adjust the rotation speed, in addition to ensure the quick change of friction opposing to the rotation, by the simple adjustment of a screw. In all cases, the risk of seizing the hinge system is restricted, not to say cancelled, since the simple parting of the mutual engagement elements composing the friction allows to return to the free movement of the hinge.

Hence, the desired object was obtained through a simple solution, easy to put in operation and at the same time easily solved, in the case of seizing problems.

It is understood that the solution now described is only one preferred embodiment of the invention and there can be several equivalent solutions, however falling within the scope of protection of the present invention, which is defined by the attached claims.

The invention claimed is:

1. A hinge for moving a door with respect to a stationary wall, the hinge comprising:

two opposing wings each provided with through fixing holes, and a mutual engagement area including shaped and complementary bushings each protruding from one wing of said opposing wings, wherein said bushings are together configured to house a matching and friction system composed of a wedge-shaped matching element and a bushing-shaped matching element opposed to each other, kept in mutual connection by a screw-nut system, wherein, during an operation of the hinge, the wedge-shaped matching element is configured to contact and broaden a portion of the bushing-shaped matching element, wherein the broadening of the portion of the bushing-shaped matching element creates a friction surface against the bushings of said opposing wings, and wherein said wedge-shaped matching element is composed of a cylindrical head provided with four equally spaced protruding ribs, a frustoconical cone appendix extending downwards from the bottom surface of said cylindrical head.

2. The hinge for moving a door with respect to a stationary wall as in claim 1, wherein said wedge-shaped matching element is composed of two halves, each half including a tab and a slot, wherein the tab of a first half is configured to engage with the slot of a second half, and a tab of the second half is configured to engage with the slot of the first half.

3. The hinge for moving a door with respect to a stationary wall as in claim 1, wherein along an inner wall of said bushings, four equally spaced grooves suitable for housing said ribs for fitting said wedge-shaped matching element inside said bushings are provided.

4. The hinge for moving a door with respect to a stationary wall as in claim 1, wherein said bushing-shaped matching element is opposite to said wedge-shaped matching element, said bushing-shaped matching element being composed of a cylindrical elongated element, provided with ribs along the side wall in correspondence with the bottom surface, said ribs being suitable to be engaged with complementary grooves arranged inside said bushings.

5. The hinge for moving a door with respect to a stationary wall as in claim 4, wherein said bushing-shaped matching element houses the nut therein.

6. The hinge for moving a door with respect to a stationary wall as in claim 5, wherein said nut is housed within a recess provided in correspondence to a window provided on the side surface of said bushing-shaped matching element, said window being arranged above the top end of said rib.

7. The hinge for moving a door with respect to a stationary wall as in claim 4, wherein the top surface of said bushing-shaped matching element at its top displays four longitudinal slots.

8. A hinge for moving a door with respect to a stationary wall, the hinge comprising:

two opposing wings each provided with through fixing holes, and a mutual engagement area including shaped and complementary bushings each protruding from one wing of said opposing wings, wherein said bushings are together configured to house a matching and friction system composed of a wedge-shaped matching element and a bushing-shaped matching element opposed to each other, kept in mutual connection by a screw-nut system, wherein, during an operation of the hinge, the wedge-shaped matching element is configured to contact and broaden a portion of the bushing-shaped matching element, wherein the broadening of the portion of the bushing-shaped matching element creates a friction surface against the bushings of said opposing wings, wherein said bushing-shaped matching element is opposite to said wedge-shaped matching element, said bushing-shaped matching element being composed of a cylindrical elongated element, provided with ribs along the side wall in correspondence with the bottom surface, said ribs being suitable to be engaged with complementary grooves arranged inside said bushings, and wherein the top surface of said bushing-shaped matching element at its top displays four longitudinal slots.

* * * * *